United States Patent
Gonze et al.

(10) Patent No.: US 8,950,177 B2
(45) Date of Patent: Feb. 10, 2015

(54) DETECTING PARTICULATE MATTER LOAD DENSITY WITHIN A PARTICULATE FILTER

(75) Inventors: Eugene V. Gonze, Pinckney, MI (US); Michael J. Paratore, Jr., Howell, MI (US); Stuart R. Smith, Howell, MI (US); Garima Bhatia, Bangalore (IN)

(73) Assignee: GM Global Technology Operations LLC

( * ) Notice: Subject to any disclaimer, the term of this patent is extended or adjusted under 35 U.S.C. 154(b) by 584 days.

(21) Appl. No.: 12/486,237

(22) Filed: Jun. 17, 2009

(65) Prior Publication Data

US 2010/0319315 A1    Dec. 23, 2010

(51) Int. Cl.
*F01N 3/10* (2006.01)
*F01N 3/027* (2006.01)
*F01N 9/00* (2006.01)
*F01N 13/00* (2010.01)

(52) U.S. Cl.
CPC ............... *F01N 3/027* (2013.01); *F01N 3/106* (2013.01); *F01N 9/002* (2013.01); *F01N 13/009* (2014.06); *F01N 2560/025* (2013.01); *F01N 2560/06* (2013.01); *F01N 2560/14* (2013.01); *F01N 2900/08* (2013.01); *F01N 2900/1606* (2013.01); *Y02T 10/47* (2013.01)
USPC .................. 60/303; 60/311; 60/286; 60/273

(58) Field of Classification Search
CPC ......... F01N 3/027; F01N 3/106; F01N 9/002; F01N 13/02; F01N 2560/06; F01N 2560/14; F01N 2900/08; F01N 2900/1606; F01N 2560/025; Y02T 10/47
USPC .................. 60/274, 284–287, 295–301, 311
See application file for complete search history.

(56) References Cited

U.S. PATENT DOCUMENTS

| | | | |
|---|---|---|---|
| 4,404,795 A | | 9/1983 | Oishi et al. |
| 4,404,796 A | | 9/1983 | Wade |
| 4,427,418 A | | 1/1984 | Kogiso et al. |
| 4,516,993 A | | 5/1985 | Takeuchi et al. |
| 4,549,395 A | * | 10/1985 | Dammann ............... 57/340 |
| 4,549,398 A | * | 10/1985 | Oishi et al. ............. 60/286 |
| 4,685,290 A | | 8/1987 | Kamiya et al. |
| 5,144,798 A | | 9/1992 | Kojima et al. |
| 5,171,335 A | | 12/1992 | Kojima et al. |

(Continued)

FOREIGN PATENT DOCUMENTS

| | | |
|---|---|---|
| CN | 1535351 | 10/2004 |
| CN | 1540143 A | 10/2004 |

(Continued)

OTHER PUBLICATIONS

David Garrod, Ph.D., Esq.; "Gloassary of Judicial Claim Constructions in the Electronics, Computer and Business Method Arts", Public Patent Foundation, v.1.4a (current as of Jan. 13, 2010), © 2010, 2 pages.

*Primary Examiner* — Jesse Bogue

(57) ABSTRACT

A control system includes a heater control module and a particulate matter (PM) load module. The heater control module selectively activates an electric heater to initiate regeneration in a zone of a particulate filter and deactivates the electric heater after the regeneration is initiated. The regeneration continues along a length of the particulate filter after the electric heater is deactivated. The PM load module determines a PM load based on an outlet temperature of the particulate filter after the regeneration is initiated.

20 Claims, 5 Drawing Sheets

(56) References Cited

U.S. PATENT DOCUMENTS

| | | | |
|---|---|---|---|
| 5,195,316 A * | 3/1993 | Shinzawa et al. | 60/274 |
| 5,207,807 A | 5/1993 | Manfre et al. | |
| 5,458,673 A | 10/1995 | Kojima et al. | |
| 5,472,462 A | 12/1995 | Pischinger et al. | |
| 5,616,835 A | 4/1997 | Schnaibel et al. | |
| 5,711,149 A * | 1/1998 | Araki | 60/278 |
| 5,716,586 A | 2/1998 | Taniguchi | |
| 5,732,550 A | 3/1998 | Muramatsu et al. | |
| 5,839,279 A | 11/1998 | Moriya et al. | |
| 6,013,118 A * | 1/2000 | Matsunuma et al. | 55/282.3 |
| 6,050,086 A | 4/2000 | Ishizuka et al. | |
| 6,090,172 A | 7/2000 | Dementhon et al. | |
| 6,167,696 B1 | 1/2001 | Maaseidvaag et al. | |
| 6,176,896 B1 | 1/2001 | Dementhon et al. | |
| 6,405,528 B1 | 6/2002 | Christen et al. | |
| 6,634,170 B2 | 10/2003 | Hiranuma et al. | |
| 6,769,246 B2 * | 8/2004 | Strohmaier et al. | 60/297 |
| 6,781,098 B2 | 8/2004 | Toyoda | |
| 6,928,809 B2 * | 8/2005 | Inoue et al. | 60/297 |
| 6,973,778 B2 | 12/2005 | Kondou et al. | |
| 7,062,904 B1 | 6/2006 | Hu et al. | |
| 7,073,326 B2 | 7/2006 | Cheong | |
| 7,111,455 B2 | 9/2006 | Okugawa et al. | |
| 7,146,804 B2 | 12/2006 | Yahata et al. | |
| 7,171,801 B2 | 2/2007 | Verkiel et al. | |
| 7,174,706 B2 * | 2/2007 | Kuboshima et al. | 60/295 |
| 7,288,137 B2 | 10/2007 | Iyer et al. | |
| 7,340,887 B2 * | 3/2008 | Ante et al. | 60/297 |
| 7,412,822 B2 | 8/2008 | Zhan et al. | |
| 7,607,295 B2 | 10/2009 | Yokoyama et al. | |
| 7,615,725 B2 | 11/2009 | Kosaka et al. | |
| 7,631,493 B2 | 12/2009 | Shirakawa et al. | |
| 7,685,811 B2 | 3/2010 | Taylor, III et al. | |
| 7,794,528 B2 | 9/2010 | Tochikawa et al. | |
| 7,841,170 B2 * | 11/2010 | Collins et al. | 60/295 |
| 7,881,853 B2 * | 2/2011 | Daneau et al. | 701/103 |
| 7,886,529 B2 | 2/2011 | Gonze et al. | |
| 7,896,956 B2 | 3/2011 | Takase et al. | |
| 7,901,475 B2 | 3/2011 | Gonze et al. | |
| 8,037,673 B2 | 10/2011 | Gonze et al. | |
| 8,146,350 B2 | 4/2012 | Bhatia et al. | |
| 8,292,987 B2 | 10/2012 | Gonze et al. | |

| | | | |
|---|---|---|---|
| 2003/0000188 A1 | 1/2003 | Harada et al. | |
| 2003/0113249 A1 | 6/2003 | Hepburn et al. | |
| 2003/0131592 A1 | 7/2003 | Saito et al. | |
| 2004/0134187 A1 | 7/2004 | Inoue et al. | |
| 2004/0194450 A1 | 10/2004 | Tanaka et al. | |
| 2005/0072141 A1 | 4/2005 | Kitahara | |
| 2005/0198944 A1 | 9/2005 | Saitoh et al. | |
| 2006/0075731 A1 | 4/2006 | Ohno et al. | |
| 2006/0225409 A1 * | 10/2006 | Kuboshima et al. | 60/295 |
| 2006/0254265 A1 * | 11/2006 | Odajima et al. | 60/297 |
| 2007/0062181 A1 * | 3/2007 | Williamson et al. | 60/297 |
| 2007/0137186 A1 | 6/2007 | Igarashi | |
| 2007/0214778 A1 | 9/2007 | Narita et al. | |
| 2007/0220869 A1 | 9/2007 | Gonze et al. | |
| 2007/0220870 A1 | 9/2007 | Gonze et al. | |
| 2007/0227104 A1 | 10/2007 | Gonze et al. | |
| 2007/0245721 A1 | 10/2007 | Colignon | |
| 2008/0041035 A1 * | 2/2008 | Sawada et al. | 60/277 |
| 2008/0083212 A1 | 4/2008 | Ament et al. | |
| 2008/0295483 A1 | 12/2008 | Scaife et al. | |
| 2009/0064664 A1 | 3/2009 | Hirata et al. | |
| 2009/0071128 A1 | 3/2009 | Gonze et al. | |
| 2009/0113883 A1 * | 5/2009 | Bhatia et al. | 60/320 |
| 2009/0158715 A1 | 6/2009 | Stroh et al. | |
| 2009/0183501 A1 | 7/2009 | Gonze et al. | |
| 2009/0288398 A1 | 11/2009 | Perfetto et al. | |
| 2010/0095657 A1 | 4/2010 | Gonze et al. | |
| 2010/0126145 A1 | 5/2010 | He et al. | |

FOREIGN PATENT DOCUMENTS

| | | |
|---|---|---|
| CN | 101091038 A | 12/2007 |
| CN | 101429884 A | 5/2009 |
| CN | 101446222 | 6/2009 |
| DE | 42 09 213 A1 | 9/1993 |
| DE | 10 2007 010 758 A1 | 9/2008 |
| DE | 102008046706 | 4/2009 |
| DE | 102008046924 A1 | 4/2009 |
| DE | 102008050169 | 5/2009 |
| DE | 10 2008 039 585 A1 | 6/2009 |
| EP | 1967712 | 9/2008 |
| GB | 2454341 A | 6/2009 |
| JP | 06-221138 | 8/1994 |
| JP | 2000-297625 | 10/2000 |

* cited by examiner

DETECTING PARTICULATE MATTER LOAD DENSITY WITHIN A PARTICULATE FILTER

FIELD

The present disclosure relates to controlling an electrically heated particulate filter.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts a mixture of air and fuel, producing drive torque. Engines such as diesel engines and compression ignition engines produce particulate matter (PM) that is filtered from exhaust gas by a particulate filter. The filter reduces PM by collecting and storing PM. Over time, the amount of PM stored in the filter may increase. A full filter may decrease exhaust flow relative to a clean filter.

During regeneration, the filter may be cleaned by burning PM within the filter. Regeneration may involve heating the filter to a combustion temperature to ignite PM. Combustion of PM further increases the filter temperature. The rate of regeneration of the filter and the filter temperature may be affected by an oxygen level in the exhaust. Increased oxygen levels in the exhaust may increase the rate of regeneration and the filter temperature.

There are various ways to perform regeneration, including modifying engine control, using a fuel burner, using a catalytic oxidizer, using microwave energy, and/or using resistive heating coils. The resistive heating coils may be arranged in contact with the filter to allow heating by both conduction and convection.

SUMMARY

A control system includes a heater control module and a particulate matter (PM) load module. The heater control module selectively activates an electric heater to initiate regeneration in a zone of a particulate filter and deactivates the electric heater after the regeneration is initiated. The regeneration continues along a length of the particulate filter after the electric heater is deactivated. The PM load module determines a PM load based on an outlet temperature of the particulate filter after the regeneration is initiated.

A method includes selectively activating an electric heater to initiate regeneration in a zone of a particulate filter, deactivating the electric heater after the regeneration is initiated, and determining a PM load based on an outlet temperature of the particulate filter after the regeneration is initiated. The regeneration continues along a length of the particulate filter after the electric heater is deactivated.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
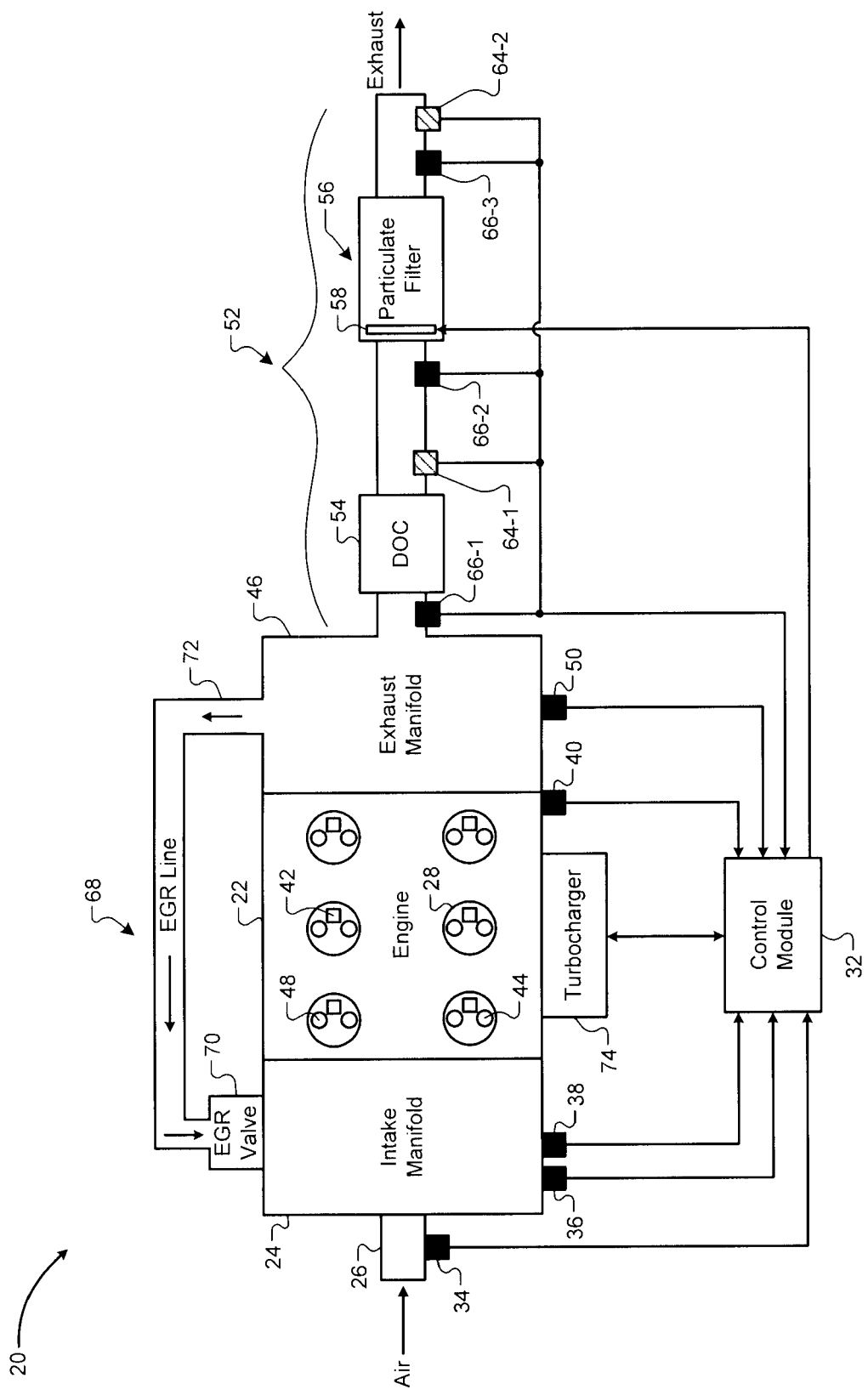
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An electrically heated particulate filter control system and method of the present disclosure activates an electric heater in predetermined exhaust conditions to initiate regeneration in a zone of a particulate filter. The electric heater is deactivated after the regeneration is initiated. The regeneration continues along a length of the particulate filter after the electric heater is deactivated. Thus, the regeneration is uncontrolled after initiation. The zone may be sufficiently small to prevent damage to the particulate filter. A PM load (e.g., density of PM in the particulate filter) may be determined based on a peak in an outlet temperature of the particulate filter after the regeneration is initiated.

Uncontrolled regeneration combusts PM at higher temperatures than controlled regeneration. Thus, the outlet temperature will be higher during uncontrolled regeneration as compared to controlled regeneration. In turn, the outlet temperature enables more accurate determinations of PM load during uncontrolled regeneration as compared to controlled regeneration. Improved PM load determination accuracy may prevent damage to the particulate filter that results from waiting too long to regenerate due to an underestimated PM load.

In addition, determining the PM load with greater accuracy may improve on-board diagnostics (OBD) that use regeneration models, such as incomplete and frequent regeneration diagnostic systems. The incomplete regeneration diagnostic system determines when regeneration of the particulate filter is incomplete. The frequent regeneration diagnostic system determines when regeneration of the particulate filter occurs too frequently. Incomplete regeneration reduces power by increasing back pressure, and overly frequent regeneration increases emissions. Therefore, improving PM load determination accuracy may increase power and reduce emissions.

Referring now to FIG. 1, an exemplary diesel engine system 20 is schematically illustrated in accordance with the present disclosure. The diesel engine system 20 is merely exemplary in nature. The electrically heated particulate filter control techniques described herein may be implemented in various engine systems that include a particulate filter. The engine systems may include gasoline direct injection engine systems and homogeneous charge compression ignition engine systems. For ease of the discussion, the disclosure will be discussed in the context of a diesel engine system.

The engine system 20 includes an engine 22 that combusts an air/fuel mixture to produce drive torque. Air is drawn into an intake manifold 24 through an inlet 26. A throttle (not shown) may be included to regulate air flow into the intake manifold 24. Air within the intake manifold 24 is distributed into cylinders 28. Although FIG. 1 depicts six cylinders 28, the engine 22 may include additional or fewer cylinders 28. For example only, engines having 4, 5, 8, 10, 12, and 16 cylinders are contemplated.

A control module 32 communicates with components of the engine system 20. The components may include the engine 22, sensors, and actuators as discussed herein. The control module 32 may implement the electrically heated particulate filter control techniques of the present disclosure.

Air passes through the inlet 26 through a mass airflow (MAF) sensor 34. The MAF sensor 34 generates a MAF signal that indicates a rate of air flowing through the MAF sensor 34. A manifold pressure (MAP) sensor 36 is positioned in the intake manifold 24 between the inlet 26 and the engine 22. The MAP sensor 36 generates a MAP signal that indicates air pressure in the intake manifold 24. An intake air temperature (IAT) sensor 38 located in the intake manifold 24 generates an IAT signal based on intake air temperature.

An engine crankshaft (not shown) rotates at engine speed or a rate that is proportional to engine speed. A crankshaft sensor 40 senses a position of the crankshaft and generates a crankshaft position (CSP) signal. The CSP signal may be related to the rotational speed of the crankshaft and cylinder events. For example only, the crankshaft sensor 40 may be a variable reluctance sensor. The engine speed and cylinder events may be sensed using other suitable methods.

The control module 32 actuates fuel injectors 42 to inject fuel into the cylinders 28. An intake valve 44 may open to enable air to enter the cylinder 28. An intake camshaft (not shown) regulates the intake valve position. A piston (not shown) compresses and combusts the air/fuel mixture within the cylinder 28. The piston drives the crankshaft during a power stroke to produce drive torque. Exhaust gas resulting from the combustion within the cylinder 28 is forced out through an exhaust manifold 46 when an exhaust valve 48 is in an open position. An exhaust camshaft (not shown) regulates the exhaust valve position. An exhaust manifold pressure (EMP) sensor 50 generates an EMP signal that indicates exhaust manifold pressure.

An exhaust treatment system 52 may treat the exhaust. The exhaust treatment system 52 may include a diesel oxidation catalyst (DOC) 54 and a particulate filter assembly 56. The DOC 54 oxidizes carbon monoxide and hydrocarbons in the exhaust based on the post combustion air/fuel ratio. The amount of oxidation increases the temperature of the exhaust.

The filter assembly 56 receives exhaust from the DOC 54 and filters any particulate matter present in the exhaust. An electric heater 58 may heat the exhaust and/or the filter to initiate regeneration of the filter assembly 56. The control module 32 controls the engine 22 and filter regeneration based on various sensed and/or estimated information.

The exhaust treatment system 52 may include oxygen sensors 64-1 and 64-2 (collectively oxygen sensors 64) and exhaust temperature sensors 66-1, 66-2, 66-3 (collectively exhaust temperature sensors 66). The oxygen sensors 64 generate signals that indicate levels of oxygen in the exhaust. Alternatively, nitrogen oxide sensors (not shown) may be used to detect levels of oxygen in the exhaust.

The exhaust temperature sensors 66 measure the temperatures of the exhaust upstream from the DOC 54 and the filter assembly 56. The exhaust temperature sensors 66 may also measure the temperatures of the exhaust downstream from the filter assembly 56 or between the DOC 54 and the filter assembly 56. The exhaust temperature sensors 66 generate signals that indicate temperatures of the exhaust. The control module 32 may generate an exhaust temperature model to estimate temperatures of the exhaust throughout the exhaust treatment system 52.

The control module 32 activates the heater 58 in predetermined exhaust conditions to initiate regeneration in a zone of the filter assembly 56. The control module deactivates the heater 58 after initiating the regeneration. The regeneration is uncontrolled after initiation, continuing along a length of the filter assembly 56 after the heater 58 is deactivated. The control module 32 may determine a PM load based on an outlet temperature of the filter assembly 56 received from the sensor 66-3 after the regeneration is initiated.

The engine system 20 may include an EGR system 68. The EGR system 68 includes an EGR valve 70 and an EGR line 72. The EGR system 68 may introduce a portion of exhaust gas from the exhaust manifold 46 into the intake manifold 24. The EGR valve 70 may be mounted on the intake manifold 24. The EGR line 72 may extend from the exhaust manifold 46 to the EGR valve 70, providing communication between the exhaust manifold 46 and the EGR valve 70. The control module 32 may actuate the EGR valve 70 to adjust an amount of exhaust gas introduced into the intake manifold 24.

The engine system 20 may include a turbocharger 74. The turbocharger 74 may be driven by the exhaust gas received through a turbine inlet. For example only, the turbocharger 74 may include a variable nozzle turbine. The turbocharger 74 increases airflow into the intake manifold to cause an increase in intake manifold pressure (i.e., boost pressure). The control module 32 may actuate the turbocharger 74 to restrict the flow of the exhaust gas, thereby controlling the boost pressure.

Figure 2:
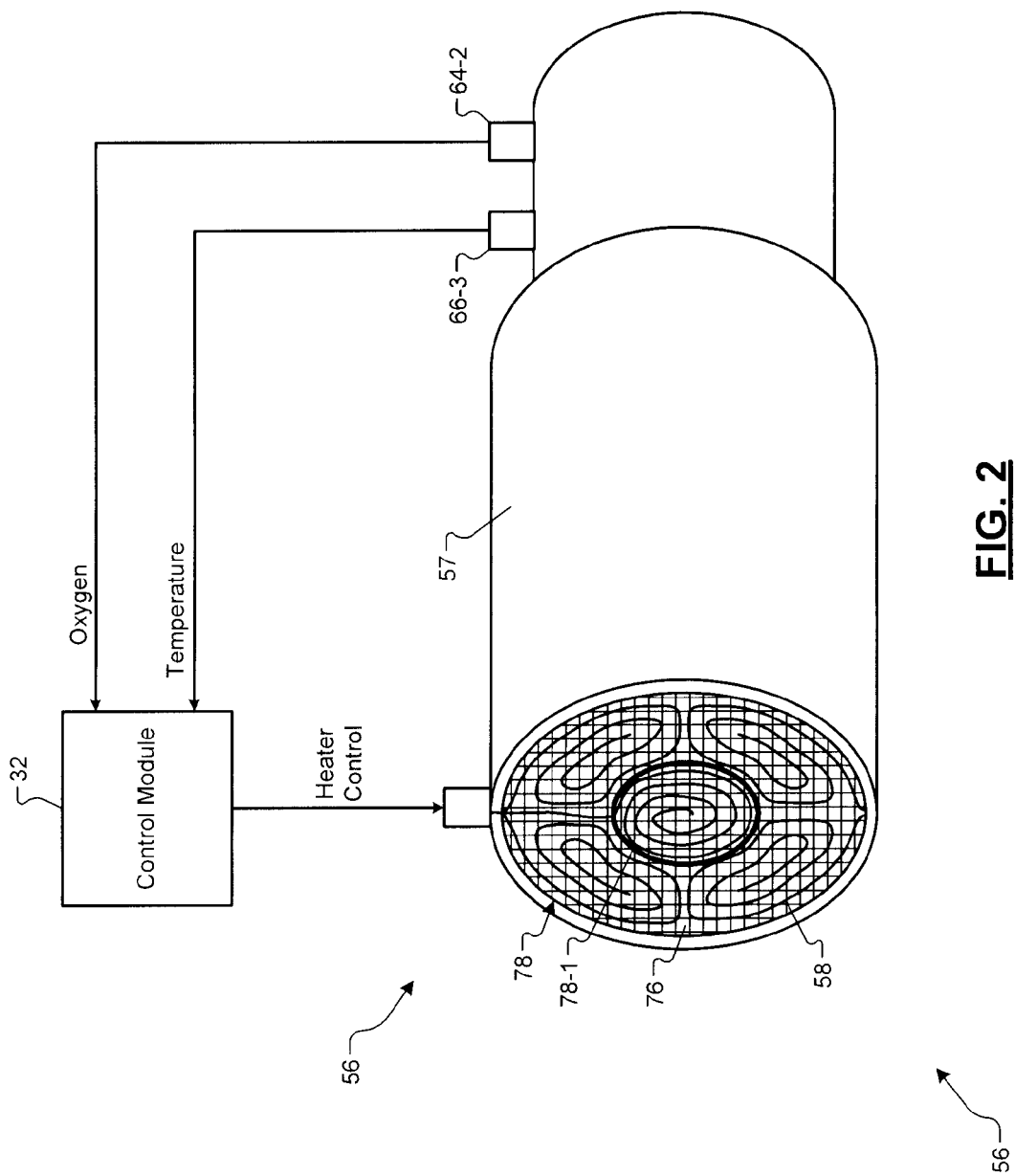
FIG. 2 illustrates an exemplary electrically heated particulate filter according to the principles of the present disclosure.
Figure 3:
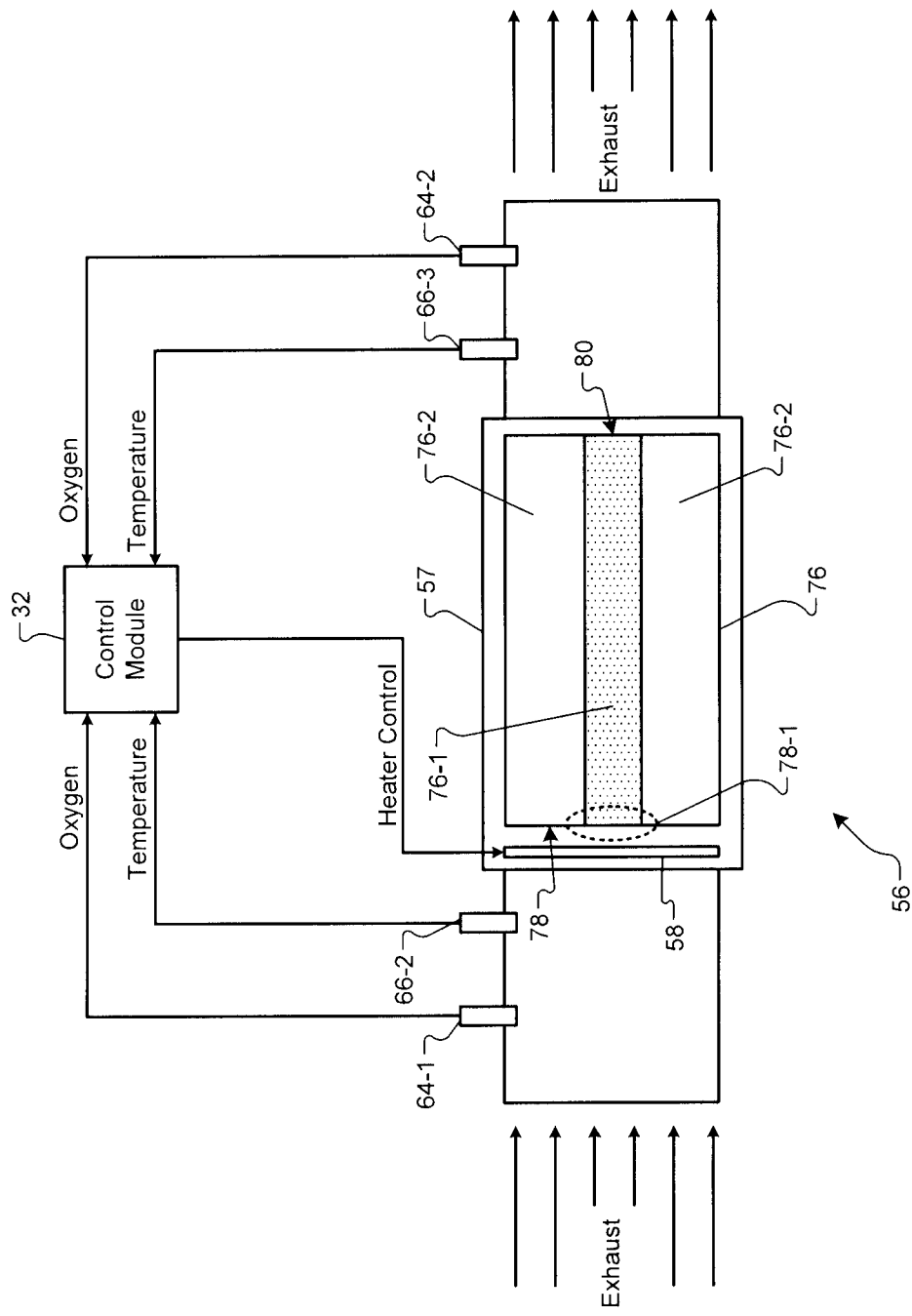
FIG. 3 illustrates regeneration of the exemplary electrically heated particulate filter according to the principles of the present disclosure.

Referring now to FIGS. 2 and 3, an exemplary embodiment of the filter assembly 56 is shown. The filter assembly 56 may include a housing 57, a particulate filter 76, and the heater 58. The heater 58 may be arranged between a laminar flow element (not shown) and a substrate of the filter 76. The substrate may be constructed or formed from a metal and/or ceramic material.

The heater 58 may comprise one or more coils, heater segments, or conductive elements that provide heating to initiate regeneration. For example only, the heater 58 may heat a first zone 78-1 of an inlet face 78 of the filter 76 in contact with or spaced from heater 58. The heater 58 may initiate uncontrolled regeneration in the zone 78-1 by increasing a temperature in the filter assembly 56 to be greater than or equal to a PM combustion temperature. For example only, the PM combustion temperature may be between 700° C. and 1000° C. For comparison only, controlled regeneration may occur at 600° C.

The zone 78-1 may include a portion of the inlet face 78. The portion of the inlet face 78 that the zone 78-1 includes may be a predetermined size that is sufficiently small to prevent damage to the filter assembly 56 during the uncontrolled regeneration. For example only, the portion may be less than ten percent of the inlet face 78.

The control module 32 may provide a signal to the heater 58 that activates the heater 58. The heater 58 may be in contact with or spaced from the filter 76 such that the heat provided to the zone 78-1 is convection and/or conduction heating. Exhaust enters the filter assembly 56 from the DOC 54 and is heated by the heater 58.

The heater 58 heats the exhaust passing through the heater 58. The heated exhaust travels to the filter 76 and heats zone 78-1 near the heater 58 by convection and/or conduction. When the PM near zone 78-1 reaches the PM combustion temperature, the heater 58 may be deactivated. The control module 32 may determine that the PM combustion temperature has been reached based on an inlet temperature from the sensor 66-2. PM near zone 78-1 ignites due to the increased temperature and initiates regeneration.

Regeneration continues through a first portion 76-1 of the filter 76. The first portion 76-1 may extend from the zone 78-1 on the inlet face 78 to an outlet face 80 of the filter 76. Regeneration of the first portion 76-1 may be achieved using heat and oxygen present in the exhaust and energy released by combustion of the PM inside the first portion 76-1. Combustion of the PM cascades down the first portion 76-1 without requiring heat from the electric heater 58.

While the first portion 76-1 regenerates, the exhaust temperature inside the filter 76 may increase. Initially, the sensor 66-3 may not detect an increase in exhaust gas temperature because the thermal mass of the filter 76 may absorb heat generated by regeneration. However, as the cascading PM moves closer to the outlet face 80 of the filter 76, the sensor 66-3 may detect an increase in the outlet temperature. When regeneration of the first portion 76-1 completes, the outlet temperature at the sensor 66-3 falls below a regeneration completion temperature.

In FIG. 3, the first portion 76-1 is depicted as an axially centered portion of the filter 76. Regeneration may be initiated in other portions by additional heaters disposed over additional zones of the inlet face 78. When regeneration of the first portion 76-1 is complete, the control module 32 may initiate regeneration in remaining zones of the inlet face 78 such as a second portion 76-2 of the filter 76. The second portion 76-2 may be an axially-centered portion surrounding the first portion 76-1.

Figure 4:
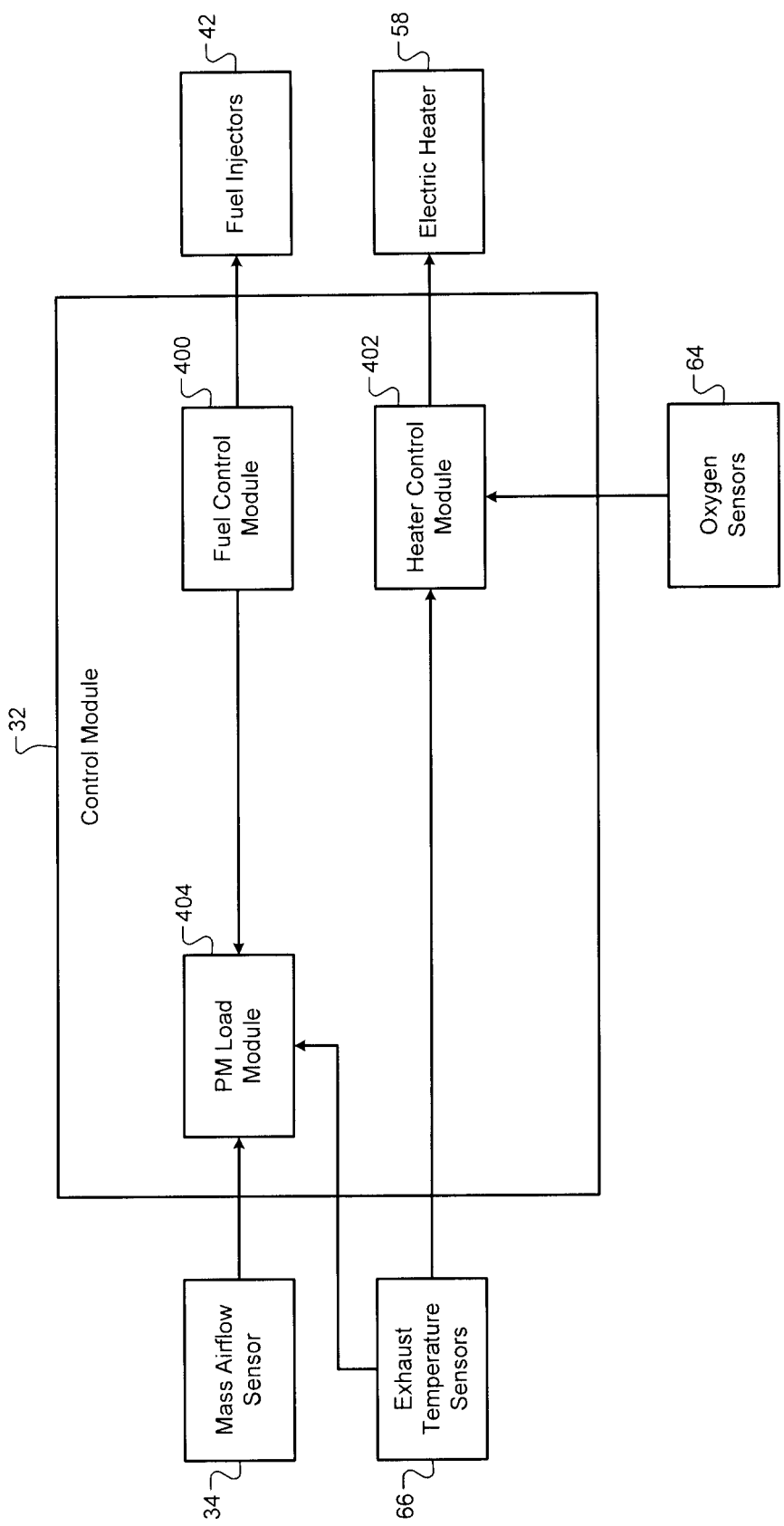
FIG. 4 is a functional block diagram of an exemplary control module according to the principles of the present disclosure.

Referring now to FIG. 4, the control module 32 may include a fuel control module 400, a heater control module 402, and a PM load module 404. The fuel control module 400 controls the fuel injectors 42 to inject fuel. The fuel control module 400 monitors a mass of fuel injected by the fuel injectors 42. The heater control module 402 may activate the electric heater 58 to initiate regeneration in a zone of the filter assembly 56, and then deactivate the electric heater 58. The regeneration is uncontrolled after initiation, continuing along a length of the filter assembly 56 after the heater 58 is deactivated.

The heater control module 402 may receive the exhaust temperatures from the exhaust temperature sensors 66 and the oxygen levels from the oxygen sensors 64. The heater control module 402 may initiate the uncontrolled regeneration based on the inlet temperature from the sensor 66-2 and one or more of the oxygen levels from the oxygen sensors 64. The heater control module 402 may refrain from initiating the uncontrolled regeneration when the inlet temperature and/or the oxygen levels are not equal to desired values.

The desired values may be predetermined to provide exhaust conditions that enable uncontrolled regeneration. The desired values may be sufficient to combust PM without heat after initiation and to enable peak temperature detection. The desired values may vary based on the PM load. For example only, a desired exhaust temperature may be approximately 450° C.

The PM load module 404 may receive the flow rate of the intake air from the MAF sensor 34, the exhaust temperatures from the exhaust temperature sensors 66, and the mass of fuel injected from the fuel control module 400. The PM load module 404 may determine an exhaust flow based on the flow rate of the intake air and the mass of fuel injected.

The PM load module 404 may determine a PM load based on an outlet temperature of the filter assembly 56 from the sensor 66-3. The PM load may be directly related to a peak in the outlet temperature after the uncontrolled regeneration is initiated. In addition, the PM load module 404 may determine the PM load based on the exhaust flow and/or an inlet temperature of the filter assembly 56 from the sensor 66-2. The PM load may be inversely related to the exhaust flow and/or the exhaust temperature.

Figure 5:
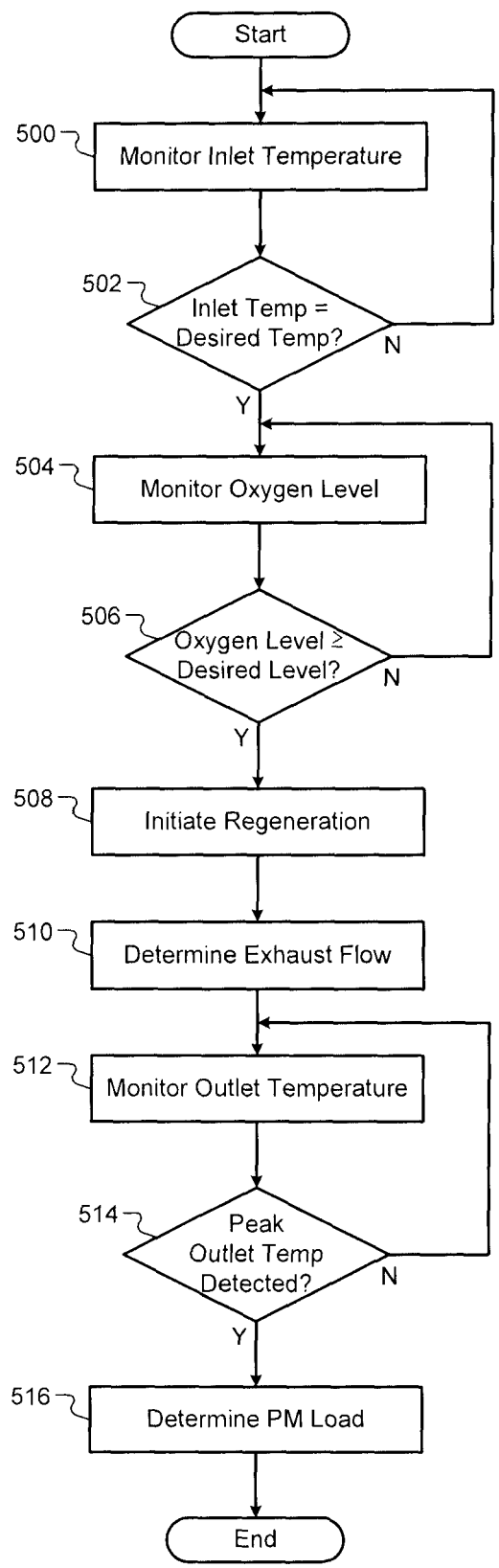
FIG. 5 is a flowchart depicting exemplary steps of a control method according to the principles of the present disclosure.

Referring now to FIG. 5, control monitors an inlet temperature in step 500. Control determines whether an inlet temperature of a particulate filter is equal to a desired temperature in step 502. The desired temperature may be a temperature range. Control returns to step 500 when the inlet temperature is not equal to the desired temperature. Control monitors an oxygen level of exhaust in step 504 when the inlet temperature is equal to a desired temperature.

Control determines whether the oxygen level is greater than or equal to a desired level in step 506. The desired level may be an oxygen level range. Control returns to step 504 when the oxygen level is less than the desired level. Control initiates regeneration in a zone of the particulate filter in step 508 when the oxygen level is greater than or equal to the desired level. The regeneration traverses an entire length of the particulate filter after initiation in an uncontrolled manner.

The zone in which the uncontrolled regeneration is initiated may include a portion of an inlet face of the particulate filter. The portion of the inlet face may be a predetermined size that is sufficiently small to prevent damage to the particulate filter during the uncontrolled regeneration. For example only, the portion may be less than ten percent of the inlet face.

Control determines an exhaust flow in step 510. Control may determine the exhaust flow based on an intake air flow and a fuel injection flow. Control monitors an outlet temperature of the particulate filter in step 512.

Control determines whether a peak in the outlet temperature is detected in step 514. Control returns to step 512 when the peak is not detected. Control determines a PM load based on the peak in the outlet temperature after the uncontrolled regeneration is initiated in step 516 when the peak is detected.

The PM load may be directly related to the peak in the outlet temperature. In addition, control may determine the PM load based on the exhaust flow and/or the inlet temperature of the particulate filter. The PM load may be inversely related to the exhaust flow and/or the inlet temperature.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:
a heater control module that selectively activates an electric heater to initiate regeneration in a zone of a particulate filter and deactivates the electric heater after the regeneration is initiated, wherein the regeneration continues along a length of the particulate filter within a portion of the particulate filter corresponding to the zone after the electric heater is deactivated; and a particulate matter (PM) load module that determines a PM load based on a peak value of an outlet temperature of the particulate filter after the regeneration is initiated and independent of values of the outlet temperature that are less than the peak value.

2. The control system of claim 1, wherein the PM load is directly related to the peak value of the outlet temperature after the regeneration is initiated.

3. The control system of claim 1, wherein the zone includes a portion of an inlet face of the particulate filter.

4. The control system of claim 3, wherein a size of the portion is predetermined to prevent damage to the particulate filter during the regeneration.

5. The control system of claim 3, wherein the portion is less than ten percent of the inlet face.

6. The control system of claim 3, wherein the heater control module selectively activates the electric heater to initiate the regeneration based on at least one of an inlet temperature and an oxygen level of the particulate filter.

7. The control system of claim 6, wherein the heater control module refrains from activating the electric heater to initiate the regeneration when the inlet temperature is not equal to a desired temperature.

8. The control system of claim 6, wherein the heater control module refrains from activating the electric heater to initiate the regeneration when the oxygen level is less than a desired level.

9. The control system of claim 6, wherein the PM load module determines the PM load further based on the inlet temperature and an exhaust flow through the particulate filter after the regeneration is initiated.

10. The control system of claim 9, wherein the PM load module determines the PM load based on an inverse relationship between the PM load and the exhaust flow through the particulate filter after the regeneration is initiated.

11. A method, comprising:
selectively activating an electric heater to initiate regeneration in a zone of a particulate filter and deactivating the electric heater after the regeneration is initiated, wherein the regeneration continues along a length of the particulate filter within a portion of the particulate filter corresponding to the zone after the electric heater is deactivated; and
determining a particulate matter (PM) load based on a peak value of an outlet temperature of the particulate filter after the regeneration is initiated and independent of values of the outlet temperature that are less than the peak value.

12. The method of claim 11, wherein the PM load is directly related to the peak value of the outlet temperature after the regeneration is initiated.

13. The method of claim 11, wherein the zone includes a portion of an inlet face of the particulate filter.

14. The method of claim 13, wherein a size of the portion is predetermined to prevent damage to the particulate filter during the regeneration.

15. The method of claim 13, wherein the portion is less than ten percent of the inlet face.

16. The method of claim 13, further comprising selectively activating the electric heater to initiate the regeneration based on at least one of an inlet temperature and oxygen level of the particulate filter.

17. The method of claim 16, further comprising refraining from activating the electric heater to initiate the regeneration when the inlet temperature is not equal to a desired temperature.

18. The method of claim 16, further comprising refraining from activating the electric heater to initiate the regeneration when the oxygen level is less than a desired level.

19. The method of claim 16, further comprising determining the PM load based on the inlet temperature and an exhaust flow through the particulate filter after the regeneration is initiated.

20. The method of claim 19, further comprising determining the PM load based on an inverse relationship between the PM load and the exhaust flow through the particulate filter after the regeneration is initiated.

\* \* \* \* \*